US011510487B2

(12) United States Patent
Deng et al.

(10) Patent No.: US 11,510,487 B2
(45) Date of Patent: Nov. 29, 2022

(54) DESKTOP LIFTING PLATFORM WITH IMPROVED SAFETY

(71) Applicant: ZHEJIANG JIECANG LINEAR MOTION TECHNOLOGY CO., LTD., Zhejiang (CN)

(72) Inventors: Qing Deng, Zhejiang (CN); Miaojiang Ding, Zhejiang (CN); Xueli Chen, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/705,254

(22) Filed: Dec. 6, 2019

(65) Prior Publication Data
US 2020/0178682 A1 Jun. 11, 2020

Related U.S. Application Data

(60) Provisional application No. 62/775,928, filed on Dec. 6, 2018.

(51) Int. Cl.
*A47B 9/04* (2006.01)
*A47B 13/08* (2006.01)

(52) U.S. Cl.
CPC .............. *A47B 9/04* (2013.01); *A47B 13/081* (2013.01); *A47B 2200/006* (2013.01)

(58) Field of Classification Search
CPC ... A47B 9/04; A47B 2200/006; A47B 13/081; G01L 5/0052
See application file for complete search history.

(56) References Cited

U.S. PATENT DOCUMENTS

| 5,140,976 A * | 8/1992 | Cheng ................ A61H 23/0263 |
| | | 601/57 |
| 5,220,698 A * | 6/1993 | Hannant ................ A61G 13/02 |
| | | 5/424 |
| 6,977,476 B2 * | 12/2005 | Koch ....................... A47B 9/00 |
| | | 318/280 |
| 2006/0266791 A1 * | 11/2006 | Koch ....................... B25H 1/16 |
| | | 228/1.1 |
| 2018/0031441 A1 * | 2/2018 | Wong ..................... A47C 31/00 |
| 2018/0368569 A1 * | 12/2018 | Laing ................... A47C 19/024 |
| 2019/0374023 A1 * | 12/2019 | Allen ..................... A47B 17/02 |
| 2021/0030146 A1 * | 2/2021 | Riebner ................... A47B 9/00 |

FOREIGN PATENT DOCUMENTS

CN 207115083 3/2018

* cited by examiner

*Primary Examiner* — Matthew W Ing
(74) *Attorney, Agent, or Firm* — JCIPRNET

(57) ABSTRACT

A desktop lifting platform includes a lifting column, a desktop, a base, a controller, and a manipulator, wherein the base is placed on a work platform like a desk; the lifting column includes a drive motor; the controller includes a main control unit (MCU) and a motor-driving circuit, the output end of the MCU is connected to the motor-driving circuit; the desktop lifting platform includes a sensing unit adaptable for detecting or sensing whether the desktop lifting platform hits an obstacle or tilts, such that when sensing that the desktop lifting platform hits the obstacle or the tilts, the sensing unit emits a signal to the controller for controlling the lifting column to stop lifting.

4 Claims, 4 Drawing Sheets

DESKTOP LIFTING PLATFORM WITH IMPROVED SAFETY

CROSS-REFERENCE TO RELATED APPLICATION

This application claims the priority benefit of U.S. provisional application Ser. No. 62/775,928, filed on Dec. 6, 2018. The entirety of the above-mentioned patent application is hereby incorporated by reference herein and made a part of this specification.

BACKGROUND

Technical Field

The present disclosure relates to desk accessory equipment, and more particularly relates to a desktop lifting platform with improved safety.

Description of Related Art

Lifting desks are commonly used in current life and work. In the market, there also emerge some desktop accessory products which may be placed on a desktop and lifted independently. Such accessory products are also referred to as desktop lifting platforms. For example, the Chinese invention patent CN108552748A discloses such a desktop lifting platform, the desktop lifting platform generally comprising: a lifting column, a desktop, a base, a controller, and a manipulator, wherein the controller comprises a main control unit (MCU) and an electric motor-driving circuit, the output end of the MCU being connected to the electric motor driving circuit.

However, conventional desktop lifting platforms have certain drawbacks during actual use. For example, if there are items placed on the desk, such items may be pressed by a supporting plate during the descending process, which, on the one hand, potentially crushes the items, and on the other hand, possibly causes overload of the electric motor in the lifting platform, thereby damaging the desktop lifting platform.

Additionally, the desktop lifting platform potentially tilts when hitting an obstacle, which not only causes damages to the desktop lifting platform per se, but also causes damages to an item on the desktop lifting platform.

SUMMARY

To overcome the drawbacks in the prior art, the present disclosure provides a desktop lifting platform with improved safety, which may better protect the desktop lifting platform and protect an item on the desktop lifting platform.

To solve the technical problems above, the present disclosure adopts a technical solution below:

A desktop lifting platform with improved safety comprises: a lifting column, a desktop, a base, a controller, and a manipulator, wherein the base is placed on a work platform like a desk; the lifting column includes a drive motor; the controller includes a main control unit (MCU) and a motor-driving circuit, the MCU being connected to the motor-driving circuit; the desktop lifting platform includes a sensing unit adaptable for detecting or sensing whether the desktop lifting platform hits an obstacle or tilts, such that when sensing that the desktop lifting platform hits an obstacle or tilts, the sensing unit emits a signal to the controller for controlling the lifting column to stop lifting.

The present disclosure has the following beneficial effects:

In the present disclosure, the desktop lifting platform is additionally provided with a sensing unit adapted for sensing whether the desktop lifting platform hits an obstacle or tilts; when sensing an exception, the sensing unit emits a signal to the controller to instruct the controller to control the lifting column to stop lifting, and after the user removes the obstacle or overcomes the tilt fault, control the lifting column to rise or descend, thereby guaranteeing normal operation of the desktop lifting platform, which not only protects the desktop lifting platform but also protects an item on the desktop lifting platform.

According to the embodiment of the present disclosure, the sensing unit is installed on the lifting column, or on the desktop, or on the manipulator.

According to the embodiment of the present disclosure, the sensing unit is a tilt switch sensor.

According to the embodiment of the present disclosure, the tilt switch sensor comprises a housing, a cavity provided in the housing, a rolling body provided in the cavity, and two contact sheets projecting inside the cavity, wherein when the rolling body simultaneously contacts with the two contact sheets, the tilt switch sensor is switched on; and when the rolling body is away from the two contact sheets, the tilt switch sensor is switched off.

According to the embodiment of the present disclosure, a bottom wall of the cavity is a bevel, and the contact sheets are located at lower portions of the bottom wall.

According to the embodiment of the present disclosure, the rolling body is a mercury bead or a metal ball.

According to the embodiment of the present disclosure, the sensing unit comprises at least two mechanical travel switches, the mechanical travel switches being mounted at two different positions at the bottom of the base, wherein when the at least two mechanical travel switches are simultaneously pressed, a first signal is generated, and when one of the mechanical travel switches is opened, a second signal is generated.

According to the embodiment of the present disclosure, the sensing unit comprises four mechanical travel switches, the four mechanical travel switches being respectively disposed at four corners of the base.

According to the embodiment of the present disclosure, each of the mechanical travel switches comprises a movable rod, a movable contact sheet being provided on the movable rod, an upper end of the movable contact sheet being provided with a first static contact sheet, a lower end of the movable contact sheet being provided with a second static contact sheet, such that when the mechanical travel switch is pressed, the movable contact sheet communicates with the first static contact sheet; and when the mechanical travel switch is not pressed, the movable contact sheet communicates with the second static contact sheet.

According to the embodiment of the present disclosure, non-slip mats are mounted on the base, the mechanical travel switches being mounted between the non-slip mats and the base, the movable rod being connected with the non-slip mats.

According to the embodiment of the present disclosure, the sensing unit is a multi-axis sensor.

According to the embodiment of the present disclosure, the sensing unit is a resistance strain gauge.

According to the embodiment of the present disclosure, the desktop and the lifting column are connected via a bottom supporting block, one or more resistance strain gauges being mounted on the bottom supporting block.

These characteristics and advantages of the present disclosure will be disclosed in detail in the preferred embodiments below with reference to the accompanying drawings.

BRIEF DESCRIPTION OF THE DRAWINGS

Hereinafter, the present disclosure will be described in further detail with reference to the accompanying drawings.

DESCRIPTION OF THE EMBODIMENTS

Hereinafter, the technical solutions of the embodiments of the present disclosure will be explained and illustrated with reference to the accompanying drawings corresponding to the embodiments of the present disclosure. However, the embodiments are only preferred embodiments of the present disclosure, not all of them. Other embodiments obtained by those skilled in the art without exercise of inventive work based on the examples in the embodiments all fall within the protection scope of the present disclosure.

In the description below, the orientation or position relationships indicated by the terms "inner," "outer," "upper," "lower," "left," and "right," etc. are intended only for facilitating or simplifying description of the present disclosure, not for indicating or implying that the devices or elements have to possess those specific orientations and have to be configured and operated with those specific orientations; therefore, they should not be understood as limitations to the present disclosure.

Embodiment 1

Figure 1:
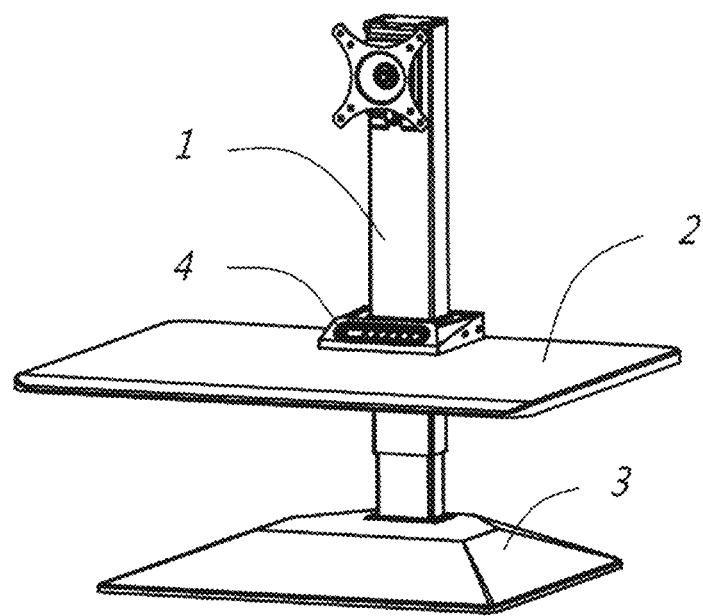
FIG. 1 shows a schematic diagram of an overall structure in the first embodiment of the present disclosure.
Figure 2:
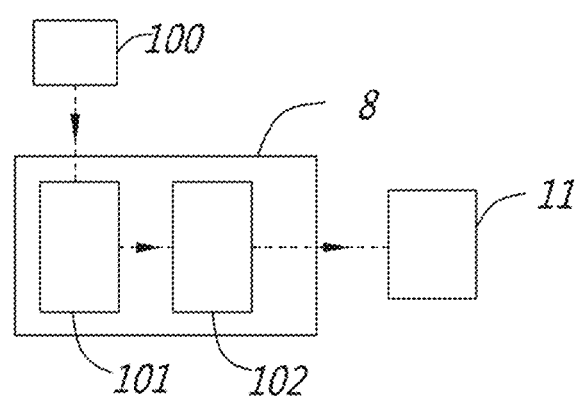
FIG. 2 shows a functional diagram in the first embodiment of the present disclosure.

As shown in FIG. 1 and FIG. 2, a desktop lifting platform comprises a lifting column 1, a desktop 2, a base 3, a controller 8, and a manipulator 4, the lifting column 1 includes a drive motor 11, wherein the desktop lifting platform is generally disposed on a desk. Specifically, the base 3 is placed on a desktop of the desk. The controller 8 comprises a main control unit (MCU) 101 and a motor-driving circuit 102, the MCU 101 being connected to the motor-driving circuit 102. The manipulator 4 is generally a manual manipulator, wherein a user controls lifting of the lifting column 1 via the manipulator 4.

The desktop lifting platform of the present disclosure includes a sensing unit 100 adaptable for detecting or sensing whether the desktop lifting platform hits an obstacle or tilts, such that when sensing that the desktop lifting platform hits an obstacle or tilts, the sensing unit 100 emits a signal to the controller 8 for controlling the lifting column 1 to stop lifting. As to controller 8, it could be an individual element, or being integrated in the manipulator 4, when it is an individual element, the controller 8 can be placed at many position, for example, in the base 3.

Figure 3:
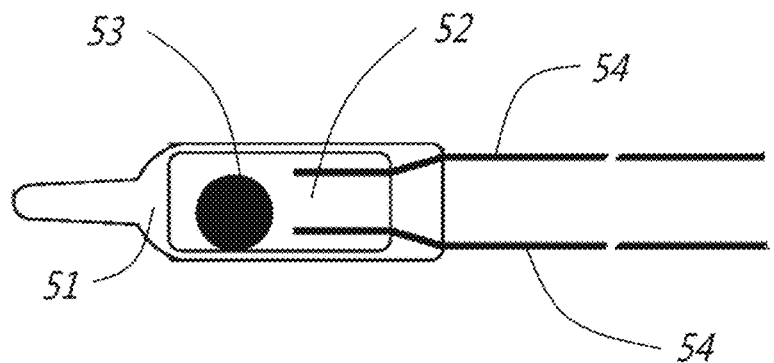
FIG. 3 shows a schematic diagram of a sensing unit in the first embodiment of the present disclosure.
Figure 4:
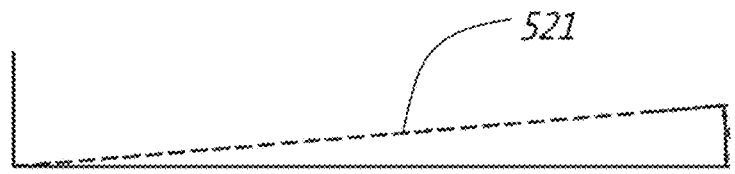
FIG. 4 shows a lateral schematic diagram of the inside of the sensing unit in the first embodiment of the present disclosure.

The sensing unit may be configured in a plurality of forms. In this embodiment, the sensing unit 100 is a tilt switch sensor. As shown in FIGS. 3 and 4, the tilt switch sensor in this embodiment is a mercury tilt switch. The mercury tilt switch comprises a housing 51, a cavity 52 provided in the housing 51, a freely rolling mercury bead 53 provided in the cavity 52, and two contact sheets 54 projecting inside the cavity 52; wherein the two contact sheets 54 are in a mutually disconnected state, the bottom wall of the cavity 52 has a certain slope, and the two contact sheets 54 are disposed at lower portions of the bottom wall 521.

The mercury tilt switch may be mounted at a plurality of positions of the desktop lifting platform, e.g., mounted on the base 3, or mounted on the lifting column 1, or mounted on the desktop 2, or mounted on the manipulator 4. In a normal lifting circumstance, the mercury bead 53 rolls towards a lower portion along a sloped cavity bottom wall 521 owing to self-weight of the mercury bead 53, and meanwhile, the mercury bead 53 simultaneously contacts two contact sheets 54 to conduct the two contact sheets 54 to thereby generate a conduction signal; at this point, the lifting column 1 may lift normally; once the desktop lifting platform tilts, it possibly triggers the mercury bead 53 to roll towards the other direction, thereby breaking the two contact sheets 54 to generate an opening signal; at this point, the lifting column 1 stops operation.

It needs to be noted that the mercury tilt switch may optionally be a rolling ball tilt switch, wherein the metal ball in the housing rolls to touch a metal terminal or change light propagation to thereby implement conduction or breaking.

Embodiment 2

Figure 5:
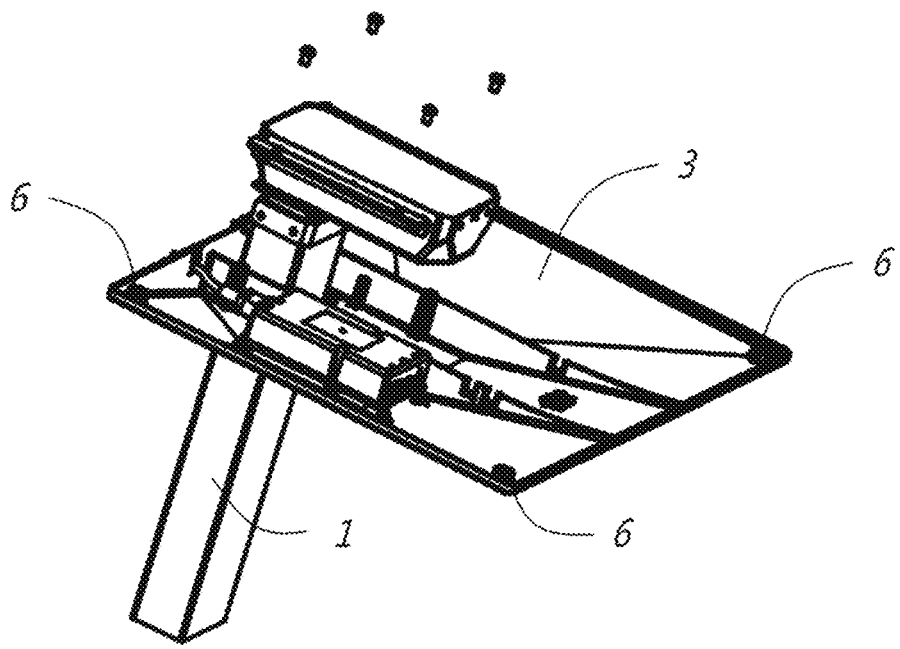
FIG. 5 shows a schematic diagram of the installation position of a sensing unit in the second embodiment of the present disclosure.
Figure 6:
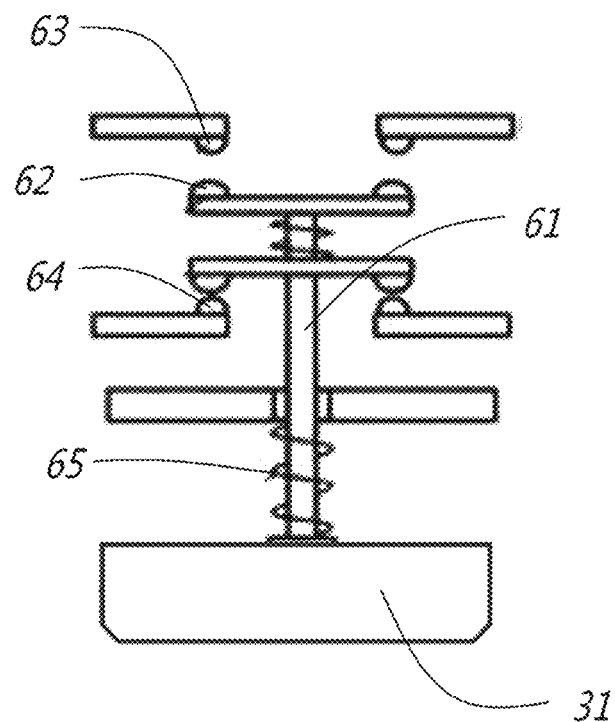
FIG. 6 shows a structural schematic diagram of the sensing unit in the second embodiment of the present disclosure.

As shown in FIGS. 5 and 6, this embodiment differs from the first embodiment in that the sensing unit comprises four mechanical travel switches 6, the 4 mechanical travel switches 6 being respectively mounted at four corners of the base 3, wherein in a normal state, when the 4 mechanical travel switches 6 are in a pressed state, a control signal is transmitted to the MCU input end via signal processing; at this point, the desktop lifting platform can work normally. When the desktop lifting platform tilts or has an exceptional condition, the base 3 is up-warped; in this case, one or more mechanical travel switches 6 resume the broken state under an elastic action; a control signal is transmitted to the MCU input end via signal processing, such that the MCU controls the desktop lifting platform to stop lifting; when the user overcomes the tilt fault to resume the desktop lifting platform to the horizontal position, the MCU cancels the lifting disabled state. The safety of the electric lifting platform is significantly improved.

Specifically, as shown in FIG. 6, non-slip mats 31 are generally mounted at four corners of the base 3; in this embodiment, the mechanical travel switches 6 are mounted between the non-slip mats 31 and the base 3. Each of the mechanical travel switches 6 comprises a movable rod 61, a movable contact sheet 62 being provided on the movable rod 61, an upper end of the movable contact sheet 62 being provided with a first static contact sheet 63, a lower end of the movable contact sheet 62 being provided with a second static contact sheet 64, such that when the mechanical travel switch 6 is pressed, the movable contact sheet 62 communicates with the first static contact sheet 63, thereby implementing conduction; and when the mechanical travel switch 6 is not pressed, the movable contact sheet 62 contacts with the second static contact sheet 64 under the elastic action of a spring 65, thereby disconnecting from the first static contact sheet 63 to implement breaking.

Embodiment 3

This embodiment differs from the first embodiment in that the sensing unit adopts a multi-axis sensor module, the multi-axis sensor module being generally placed on the desktop or in the controller in the base; during the lifting process, an obstacle or the user's limb placed between the desktop and the base or between the desktop and the plane where the base is disposed should be prevented from crushing and damaging, thereby preventing the entire desktop lifter from tilting or toppling over to cause a safety accident.

The multi-axis sensor module comprises an MPU 6050 module and a central processing unit, wherein the MPU 6050 includes a three-axis accelerometer for acquiring three-axis acceleration data and a three-axis gyroscope for acquiring three-axis angular velocity data; wherein the three-axis accelerometer and the three-axis gyroscope are configured for detecting change of the multi-dimensional acceleration and multi-dimensional angular velocity data at the instant when the desktop collides with the obstacle to thereby implement collision detection; the multi-axis sensor module has a high detection sensitivity and improves safety of the electric lifting platform. The details of multi-axis sensor module may refer to the Chinese invention patent CN207115083U.

Embodiment 4

Figure 7:
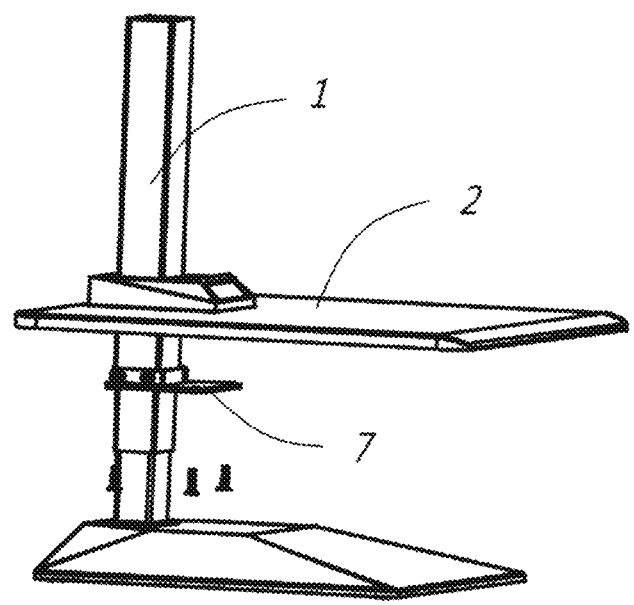
FIG. 7 shows a schematic diagram of the installation position of a sensing unit in the fourth embodiment of the present disclosure.
Figure 8:
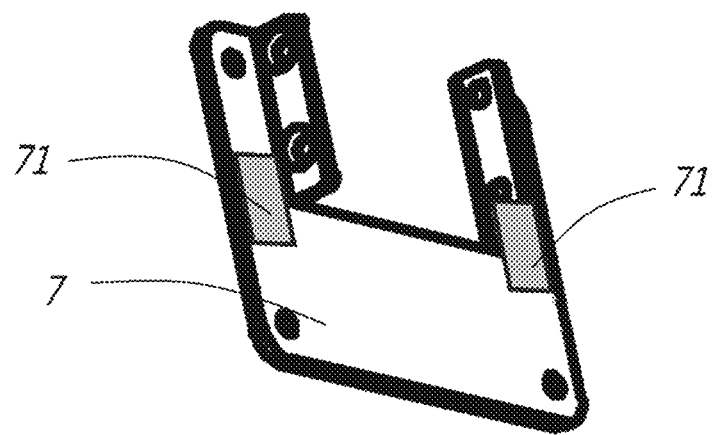
FIG. 8 shows a schematic diagram of the specific installation position of the sensing unit in the fourth embodiment of the present disclosure.

As shown in FIGS. 7 and 8, this embodiment differs from the first embodiment in that the sensing unit adopts a resistance strain gauge 71. In the desktop lifting platform, the desktop 2 and the lifting column 1 are connected via a bottom supporting block 7, and the force applied against the platform should be transmitted to the column via the bottom supporting block 7. In this embodiment, one or more resistance strain gauges 71 are mounted on the bottom supporting block 7.

When the user is adjusting lifting, if the desktop 2 hits an obstacle, the load on the desktop 2 changes. The change is transmitted to the bottom supporting block 7, and then the bottom supporting block 7 is deformed. The resistance strain gauge 71 convers change of the strain on the bottom supporting block 7 into resistance change, and then the resistance change is subjected to signal processing and amplification to the MCU. The control signal, after being recognized by the MCU, is transmitted to the motor-driving circuit. The motor-driving circuit controls the lifting column 1 to execute a corresponding back action.

What have been described above are only preferred embodiments of the present disclosure; however, the protection scope of the present disclosure is not limited thereto. A person skilled in the art should understand that the present disclosure includes, but not limited to the contents described in the drawings and the preferred embodiments. Any modifications without departing from the functions and structural principles of the present disclosure will be included within the scope of the claims.

What is claimed is:

1. A desktop lifting platform, comprising: a lifting column, a desktop, a base, a controller, and a manipulator, wherein the lifting column comprises a drive motor; the controller comprises a main control unit (MCU) and a motor-driving circuit, the MCU is connected to the motor-driving circuit; the desktop lifting platform comprises a sensing unit adaptable for detecting or sensing whether the desktop lifting platform hits an obstacle or tilts, such that when sensing that the desktop lifting platform hits the obstacle or the tilts, the sensing unit emits a signal to the controller for controlling the lifting column to stop lifting, wherein the sensing unit is installed on the lifting column, or on the desktop, or on the manipulator, the sensing unit comprises at least two mechanical travel switches, the at least two mechanical travel switches are mounted at two different positions at a bottom of the base, when the at least two mechanical travel switches are simultaneously pressed, a first signal is generated, and when one of the at least two mechanical travel switches is opened, a second signal is generated.

2. The desktop lifting platform according to claim 1, wherein the sensing unit comprises four mechanical travel switches, and the four mechanical travel switches are respectively disposed at four corners of the base.

3. The desktop lifting platform according to claim 1, wherein each of the at least two mechanical travel switches comprises a movable rod, a movable contact sheet being provided on the movable rod, an upper end of the movable contact sheet being provided with a first static contact sheet, a lower end of the movable contact sheet being provided with a second static contact sheet, such that when the at least two mechanical travel switch is pressed, the movable contact sheet communicates with the first static contact sheet; and when the at least two mechanical travel switch is not pressed, the movable contact sheet communicates with the second static contact sheet.

4. The desktop lifting platform according to claim 3, wherein non-slip mats are mounted on the base, the at least two mechanical travel switches is mounted between the non-slip mats and the base, and the movable rod is connected with the non-slip mats.

* * * * *